Patented Apr. 6, 1943

2,315,924

UNITED STATES PATENT OFFICE 2,315,924

PROCESS FOR PREVENTING RUBBER OBJECTS FROM STICKING TOGETHER AND IMPROVING THE QUALITY AND DURABILITY OF RAW RUBBER IN A DIVIDED STATE

Simon Hendrik Bertram, The Hague, Netherlands; vested in the Alien Property Custodian No Drawing. Application September 27, 1938, Serial No. 232,010. In the Netherlands September 28, 1937

1 Claim. (Cl. 260—746)

It is known that raw or unvulcanised rubber, balatum, gutta percha and the like have a tendency to stick together, whether in the form of sheets or crumbs or powder.

It has been proposed to prevent objects of raw rubber and the like from sticking together by dusting such objects with a powder such as zinc stearate, magnesium carbonate, magnesia powder, chalk, etc. This method has been used for instance in order to prevent sheets of rubber adhering to each other.

It has also been disclosed to manufacture rubber powder and rubber dust by spray drying latex, to which a protective substance has been added in such a manner that every particle of the dry rubber powder has a coating of the protecting addition, in order to prevent the separate particles from sticking together. If no protecting substance has been added to the latex the spray drying will yield only a porous mass, formed by the sticking together of the spray dried rubber particles.

It has further been proposed to add to rubber powder or rubber dust, obtained by spray drying latex, small amounts of other powdery substances such as magnesium oxide, talcum, zinc stearate.

While the methods mentioned above may give a temporary protection, it has turned out, however, that after a longer or shorter time the objects or particles do stick together, especially under severe condition.

An object of the present invention consists in more effectively preventing raw rubber, balatum, gutta percha and the like in the form of articles (including sheets and the like) from sticking together.

Another object is to produce a crumb, powder or dust of the said substances the particles of which practically show no sticking tendency, irrespective whether these particles are obtained by drying the corresponding milk juices with an addition of substances such as magnesium oxide, talcum and so on, or without such an addition.

A further object consists in obtaining a finely divided loose powder from powder or dust of rubber and the like which has already agglomerated more or less.

According to my invention I use infusorial or diatomaceous earth for achieving the above said purposes.

It is to be understood that when in the specification and in the claim the word "rubber" is used it is meant to include its obvious equivalents such as balatum, gutta percha and so on. Similarly in the specification and in the claim the word "infusorial earth" stands for all substances rich in silicic acid and showing similar properties with respect to specific weight and moisture absorbing capacity, such as kaolin and bolus alba.

In comparison to other powders, such as zinc stearate, rice flour, talc, chalk, magnesium oxide and the like, infusorial earth, (diatomaceous earth) is surprisingly better capable of preventing separate objects or particles of unvulcanised or raw rubber, whether in the state of sheets or crumbs or powder, from agglomerating to larger masses. The specific action of this substance may probably be attributed to the following properties:

(a) As a consequence of its large absorption power for liquids (according to literature infusorial earth is capable of absorbing about 5 times its weight of water) infusorial earth will keep the surface dry upon which it is dusted, for a long period. It absorbs liquid particles such as dissolved resins and gums from the remaining rubber serum, that are chiefly responsible for the sticking together of rubber objects and particles. It is important that these sticky liquids and all other exudates are absorbed by the infusorial earth.

(b) The relatively low specific gravity of infusorial earth is a special advantage when mixed with rubber powder, crumb or dust as it minimizes the danger of separation caused by difference in specific gravity which is frequently observed if chalk, tricalcium phosphate and the like are added.

(c) The chemical inertness of infusorial earth prevents its forming combinations with all substances contained in raw rubber or substances commonly used as additions, which might cause a kind of cementation.

I have given this explanation of the specific action of infusorial earth only for facilitating the understanding of the invention but it is not bound to any theory. I have found that infusorial earth has a much better action in preventing sticking than other powders and that is the gist of this invention.

Dusting with infusorial earth is very useful when sheets of rubber are piled on a heap. This will prevent the separate sheets from sticking to each other which is liable to occur if the heap is stored for a prolonged period.

Another important use is to maintain crumb rubber in its original condition. Recently many methods have been disclosed for making raw rubber with or without additions into the form of crumb. In storing this crumb rubber the original condition is often not maintained but an adhering mass is formed which can be separated again only incompletely and with difficulty into a crumb like mass. This heavy drawback is removed by dusting the crumb with infusorial earth.

Another important use is to prevent rubber powder or rubber dust from agglomerating to a coherent mass. Rubber powder and rubber dust are generally obtained by spray drying latex.

One such method of obtaining a very fine rubber powder has been described in the British Patent specification No. 439,777. The spray dried rubber powder according to such methods, even when suitable additions have been made to the latex, however, cannot be stored for a long time. In moist air the particles agglomerate rather quickly but even in dry air at ordinary temperature agglomeration takes place in course of time. In order to prevent this agglomeration it has already been proposed in said British patent specification No. 439,777 to add for instance 3% magnesium oxide to the very fine powdery product formed by spray drying the latex to which the protecting substance has been added. This addition of magnesium oxide does not, however, produce a permanently non-agglomerating product under all atmospheric conditions. If, however, the magnesium oxide is replaced by infusorial earth a very durable powdery product is obtained, even if no anti-adhesive substances have been added to the latex beforehand.

The infusorial earth powder may be added to the rubber powder or rubber dust after its preparation or already in the drying apparatus in which it is prepared.

It has also been found that it is not always necessary to add the infusorial earth to the powder before it has had time for agglomerating. It may be even added to powder which has agglomerated to some extent. By rubbing the aggregates with infusorial earth, the aggregates are broken again into powder and protected against further agglomeration.

*Example*

To 100 parts by weight of a latex powder prepared in the Dutch Indies by spray drying latex to which had been added 8% of zinc ammonium phosphate which after drying forms a protective coating on the obtained rubber powder, so that indeed a dry and loose powder was obtained, which however, during transport to Holland had been more or less agglomerated, 10 parts by weight of infusorial earth were added and well mixed into it. Thereby a fine loose powder was obtained from which by a moderate pressure no larger particles were formed as would have been the case if the latex powder had not been mixed with infusorial earth. Also on keeping for a considerable time at a temperature of 40° C. in an atmosphere saturated with moisture the favourable properties of the latex powder—infusorial earth mixture were maintained.

The favourable action of infusorial earth takes place even by the addition of a small percentage such as 1%. The quantity to be added to prevent practically all agglomeration of a powder depends on many conditions such as the quantity and the nature of the agent—if any—which has been added to the latex to prevent the sticking together of the original spray dried rubber particles. It further depends on the requirements desired of the powder, on mechanical and atmospheric conditions to which it is subjected etc. Under severe conditions it may be found desirable to add much larger quantities of infusorial earth, for example 30% or 40% or more.

What I claim is:

Process for the production of nonsticking rubber powder which comprises spray drying an aqueous rubber suspension and mixing infusorial earth powder with the sprayed aqueous rubber suspension while it is in suspension in the drying gas.

SIMON HENDRIK BERTRAM.